(12) United States Patent
Zimmerman et al.

(10) Patent No.: US 12,547,177 B2
(45) Date of Patent: Feb. 10, 2026

(54) SYSTEMS AND METHODS FOR MANAGING A ROBOTIC CHARGING SYSTEM OF A MANUFACTURING ENVIRONMENT

(71) Applicant: Ford Global Technologies, LLC, Dearborn, MI (US)

(72) Inventors: Jon Zimmerman, Ferndale, MI (US); Hussein Chami, Dearborn, MI (US); Brian McIntyre, Dexter, MI (US); Francis Maslar, Grosse Ile, MI (US); Yifan Chen, Ann Arbor, MI (US); Raj Sohmshetty, Canton, MI (US); Smruti Panigrahi, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 18/177,967

(22) Filed: Mar. 3, 2023

(65) Prior Publication Data
US 2024/0295878 A1 Sep. 5, 2024

(51) Int. Cl.
*G05D 1/00* (2024.01)
*B60L 53/62* (2019.01)
(Continued)

(52) U.S. Cl.
CPC ............ *G05D 1/0225* (2013.01); *B60L 53/62* (2019.02); *B60L 53/65* (2019.02); *B60L 53/66* (2019.02);
(Continued)

(58) Field of Classification Search
CPC ................................ B06L 58/12; G06Q 40/06
See application file for complete search history.

(56) References Cited

U.S. PATENT DOCUMENTS 10,870,364 B2  12/2020  Mere
11,110,813 B2 *  9/2021  Hou ........................ B60L 53/35
(Continued)

FOREIGN PATENT DOCUMENTS

CN          215848200          2/2022
EP          3517353 A1 *       7/2019   .............. B60L 53/30
(Continued)

OTHER PUBLICATIONS

Zhi Cao, Der-Horng Lee, Qiang Meng, Deployment strategies of double-rail-mounted gantry crane systems for loading outbound containers in container terminals, International Journal of Production Economics, vol. 115, Issue 1, 2008, pp. 221-228. (Year: 2008).*
(Continued)

*Primary Examiner* — Hitesh Patel
*Assistant Examiner* — Tabitha Kress
(74) *Attorney, Agent, or Firm* — Burris Law, PLLC

(57) ABSTRACT

A method includes obtaining vehicle data associated with the plurality of vehicles, obtaining charging station data associated with the plurality of charging stations, and obtaining robot data associated with the one or more robots. The method includes determining, based on the vehicle data, whether a given vehicle has a given amount of electrical energy that is less than a threshold amount of electrical energy. The method includes, in response to determining that the given amount of electrical energy is less than the threshold amount of electrical energy: selecting a given charging station based on the charging station data and a given robot based on the robot data, instructing the given vehicle and the given robot to navigate to the given charging station, and instructing the given robot to initiate a charging routine when the given vehicle and the given robot are proximate to the given charging station.

20 Claims, 7 Drawing Sheets

(51) Int. Cl.
   *B60L 53/65* (2019.01)
   *B60L 53/66* (2019.01)
(52) U.S. Cl.
   CPC ......... *G05D 1/0022* (2013.01); *G05D 1/0088* (2013.01)

(56) References Cited

U.S. PATENT DOCUMENTS

| | | | |
|---|---|---|---|
| 11,605,964 B1* | 3/2023 | Palombini | H02J 7/00032 |
| 11,807,121 B2* | 11/2023 | Zhao | B60L 53/16 |
| 11,858,368 B1* | 1/2024 | Carter | B60L 53/37 |
| 2011/0077809 A1* | 3/2011 | Leary | B60L 53/14 |
| | | | 320/109 |
| 2012/0013300 A1* | 1/2012 | Prosser | B60L 53/30 |
| | | | 320/109 |
| 2013/0076902 A1* | 3/2013 | Gao | B25J 9/042 |
| | | | 348/148 |
| 2013/0088194 A1* | 4/2013 | Hunter | B60L 53/30 |
| | | | 320/108 |
| 2014/0354229 A1* | 12/2014 | Zhao | B60L 53/68 |
| | | | 320/109 |
| 2016/0178376 A1* | 6/2016 | Moore | G08G 1/0133 |
| | | | 701/538 |
| 2016/0352113 A1 | 12/2016 | Zhao et al. | |
| 2020/0264258 A1* | 8/2020 | Zhang | H04W 4/46 |
| 2022/0134893 A1 | 5/2022 | Liu et al. | |
| 2023/0145508 A1 | 5/2023 | Kaphengst et al. | |

FOREIGN PATENT DOCUMENTS

| | | | |
|---|---|---|---|
| WO | WO-2018176417 A1 * | 10/2018 | H02J 7/00 |
| WO | 2020011411 | 1/2020 | |
| WO | 2021229115 | 11/2021 | |

OTHER PUBLICATIONS

A. Noureldin, T.B. Karamat, J. Gregory, Fundamentals of Inertial Navigation, Satellite-based Positioning and their Integration, Springer-Verlag Berlin Heidelberg, Edition XVIII, 2013, pp. 21-63.; hereinafter Noureldin (Year: 2013).*

Gerald Cook, Feitian Zhang, Remote Sensing, Mobile Robots: Navigation, Control and Sensing, Surface Robots and AUVs, Edition 2, 2020, pp. 171-201. (Year: 2020).*

Z. Cao, C.-C. Chu and R. Gadh, "An autonomous electric vehicle based charging system: Matching and charging strategy," 2018 IEEE Power & Energy Society Innovative Smart Grid Technologies Conference (ISGT), Washington, DC, USA, 2018, pp. 1-5. (Year : 2018).*

* cited by examiner

SYSTEMS AND METHODS FOR MANAGING A ROBOTIC CHARGING SYSTEM OF A MANUFACTURING ENVIRONMENT

FIELD

The present disclosure relates to systems and method for managing a robotic charging system of a manufacturing environment.

BACKGROUND

The statements in this section merely provide background information related to the present disclosure and may not constitute prior art.

In a manufacturing environment, one or more charging stations for electric vehicles may be provided as the electric vehicle navigate within the manufacturing environment. As an example and upon completion of a manufacturing process for the electric vehicle, a control system may control the movement of the electric vehicle to navigate to a charging station and receive an electrical charge prior to being temporarily positioned at various post-production locations of the manufacturing environment, such as a parking lot. However, controlling the movement of multiple electric vehicles through various charging stations to efficiently charge the electric vehicles and maintain the electrical charge of the vehicles is a resource and time intensive task. These issues related to controlling the movement of multiple electric vehicles through various charging stations, among other issues, are addressed by the present disclosure.

SUMMARY

This section provides a general summary of the disclosure and is not a comprehensive disclosure of its full scope or all of its features.

The present disclosure provides a method for controlling a robotic charging system configured to charge a plurality of vehicles, the robotic charging system comprising a plurality of charging stations and one or more robots. The method includes obtaining vehicle data associated with the plurality of vehicles, where the vehicle data indicates one or more electrical charging characteristics of each of the plurality of vehicles, obtaining charging station data associated with the plurality of charging stations, where the charging station data indicates an availability of each of the plurality of charging stations, and obtaining robot data associated with the one or more robots, where the robot data indicates one or more positional characteristics of each of the one or more robots and an availability of each of the one or more robots. The method includes determining, based on the vehicle data, whether a given vehicle from among the plurality of vehicles has a given amount of electrical energy that is less than a threshold amount of electrical energy. The method includes, in response to determining that the given amount of electrical energy is less than the threshold amount of electrical energy: selecting a given charging station from among the plurality of charging stations based on the charging station data and a given robot from among the one or more robots based on the robot data, instructing the given vehicle and the given robot to navigate to the given charging station, and instructing the given robot to initiate a charging routine when the given vehicle and the given robot are proximate to the given charging station.

The following paragraph includes variations of the method of the above paragraph, and the variations may be implemented individually or in any combination.

In one form, the one or more electrical charging characteristics of each of the plurality of vehicles indicates an amount of electrical energy of each of the plurality of vehicles, a charging time of each of the plurality of vehicles, a position of a charging port of each of the plurality of vehicles, or a combination thereof. In one form, the vehicle data further indicates one or more positional characteristics of each of the plurality of vehicles, one or more physical characteristics of each of the plurality of vehicles, or a combination thereof. In one form, the one or more positional characteristics of each of the plurality of vehicles indicates a location of each of the plurality of vehicles, a trajectory of each of the plurality of vehicles, an orientation of each of the plurality of vehicles, or a combination thereof. In one form, the one or more physical characteristics of each of the plurality of vehicles indicates a vehicle type of each of the plurality of vehicles, a vehicle width of each of the plurality of vehicles, a vehicle length of each of the plurality of vehicles, or a combination thereof. In one form, the one or more positional characteristics of each of the one or more robots indicates a location of each of the one or more robots, a trajectory of each of the one or more robots, an orientation of each of the one or more robots, or a combination thereof. In one form, instructing the given robot to navigate to the given charging station further comprises broadcasting a command to the given robot to travel along a gantry proximate to the given charging station. In one form, the given robot is a mobile robot, and instructing the given robot to navigate to the given charging station further comprises broadcasting a command to the mobile robot to autonomously travel proximate to the given charging station. In one form, the vehicle data further indicates a vehicle-based location of the given vehicle, the robot data indicates a robot-based location of the given robot, and instructing the given robot to initiate the charging routine when the given vehicle and the given robot are proximate to the given charging station further comprises: obtaining a robot-based location of an electric charger of the given charging station, converting the vehicle-based location of the given vehicle to a robot-based location of the given vehicle, and defining a robotic path based on the robot-based location of the electric charger, the robot-based location of the given robot, and a robot-based location of the given vehicle. In one form, instructing the robot to initiate the charging routine when the given vehicle and the given robot are proximate to the given charging station further comprises: opening, by an end of arm tool of the given robot, a charging port cover of the given vehicle, and positioning, by the end of arm tool, the electric charger proximate to a charging port of the given vehicle based on the robotic path.

The present disclosure provides system for controlling a robotic charging system configured to charge a plurality of vehicles, the robotic charging system comprising a plurality of charging stations and one or more robots. The system includes one or more processors and one or more nontransitory computer-readable mediums comprising instructions that are executable by the one or more processors. The instructions include obtaining vehicle data associated with the plurality of vehicles, where the vehicle data indicates one or more electrical charging characteristics of each of the plurality of vehicles, and where the one or more electrical charging characteristics of each of the plurality of vehicles indicates an amount of electrical energy of each of the plurality of vehicles, a charging time of each of the plurality of vehicles, a position of a charging port of each of the plurality of vehicles, or a combination thereof. The instructions include obtaining charging station data associated with the plurality of charging stations, where the charging station data indicates an availability of each of the plurality of charging stations. The instructions include obtaining robot data associated with the one or more robots, where the robot data indicates one or more positional characteristics of each of the one or more robots and an availability of each of the one or more robots. The instructions include determining, based on the vehicle data, whether a given vehicle from among the plurality of vehicles has a given amount of electrical energy that is less than a threshold amount of electrical energy. The instructions include, in response to determining that the given amount of electrical energy is less than the threshold amount of electrical energy: selecting a given charging station from among the plurality of charging stations based on the charging station data and a given robot from among the one or more robots based on the robot data, instructing the given vehicle and the given robot to navigate to the given charging station, and instructing the given robot to initiate a charging routine when the given vehicle and the given robot are proximate to the given charging station.

The following paragraph includes variations of the system of the above paragraph, and the variations may be implemented individually or in any combination.

In one form, the vehicle data further indicates one or more positional characteristics of each of the plurality of vehicles, one or more physical characteristics of each of the plurality of vehicles, or a combination thereof. In one form, the one or more positional characteristics of each of the plurality of vehicles indicates a location of each of the plurality of vehicles, a trajectory of each of the plurality of vehicles, an orientation of each of the plurality of vehicles, or a combination thereof. In one form, the one or more physical characteristics of each of the plurality of vehicles comprises a vehicle type of each of the plurality of vehicles, a vehicle width of each of the plurality of vehicles, a vehicle length of each of the plurality of vehicles, or a combination thereof. In one form, the one or more positional characteristics of each of the one or more robots indicates a location of each of the one or more robots, a trajectory of each of the one or more robots, an orientation of each of the one or more robots, or a combination thereof. In one form, the vehicle data further indicates a vehicle-based location of the given vehicle, the robot data indicates a robot-based location of the given robot, and the instructions for instructing the given robot to initiate the charging routine when the given vehicle and the given robot are proximate to the given charging station further comprise: obtaining a robot-based location of an electric charger of the given charging station, converting the vehicle-based location of the given vehicle to a robot-based location of the given vehicle, and defining a robotic path based on the robot-based location of the electric charger, the robot-based location of the given robot, and a robot-based location of the given vehicle. In one form, the instructions for instructing the robot to initiate the charging routine when the given vehicle and the given robot are proximate to the given charging station further comprise: opening, by an end of arm tool of the given robot, a charging port cover of the given vehicle, and positioning, by the end of arm tool, the electric charger proximate to a charging port of the given vehicle based on the robotic path.

The present disclosure provides a method for controlling a robotic charging system configured to charge a plurality of vehicles, the robotic charging system comprising a plurality of charging stations and one or more robots. The method includes obtaining vehicle data associated with the plurality of vehicles, where the vehicle data indicates one or more electrical charging characteristics of each of the plurality of vehicles, and where the one or more electrical charging characteristics of each of the plurality of vehicles indicates an amount of electrical energy of each of the plurality of vehicles, a charging time of each of the plurality of vehicles, a position of a charging port of each of the plurality of vehicles, or a combination thereof. The method includes obtaining charging station data associated with the plurality of charging stations, where the charging station data indicates an availability of each of the plurality of charging stations. The method includes obtaining robot data associated with the one or more robots, where the robot data indicates one or more positional characteristics of each of the one or more robots and an availability of each of the one or more robots. The method includes determining, based on the vehicle data, whether a given vehicle from among the plurality of vehicles has a given amount of electrical energy that is less than a threshold amount of electrical energy. The method includes, in response to determining that the given amount of electrical energy is less than the threshold amount of electrical energy: selecting a given charging station from among the plurality of charging stations based on the charging station data and a given robot from among the one or more robots based on the robot data, instructing the given vehicle and the given robot to navigate to the given charging station, and instructing the given robot to initiate a charging routine when the given vehicle and the given robot are proximate to the given charging station.

The following paragraph includes variations of the method of the above paragraph, and the variations may be implemented individually or in any combination.

In one form, the vehicle data further indicates a vehicle-based location of the given vehicle, the robot data indicates a robot-based location of the given robot, and instructing the given robot to initiate the charging routine when the given vehicle and the given robot are proximate to the given charging station further comprises: obtaining a robot-based location of an electric charger of the given charging station, converting the vehicle-based location of the given vehicle to a robot-based location of the given vehicle, and defining a robotic path based on the robot-based location of the electric charger, the robot-based location of the given robot, and a robot-based location of the given vehicle. In one form, instructing the robot to initiate the charging routine when the given vehicle and the given robot are proximate to the given charging station further comprises: opening, by an end of arm tool of the given robot, a charging port cover of the given vehicle, and positioning, by the end of arm tool, the electric charger proximate to a charging port of the given vehicle based on the robotic path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
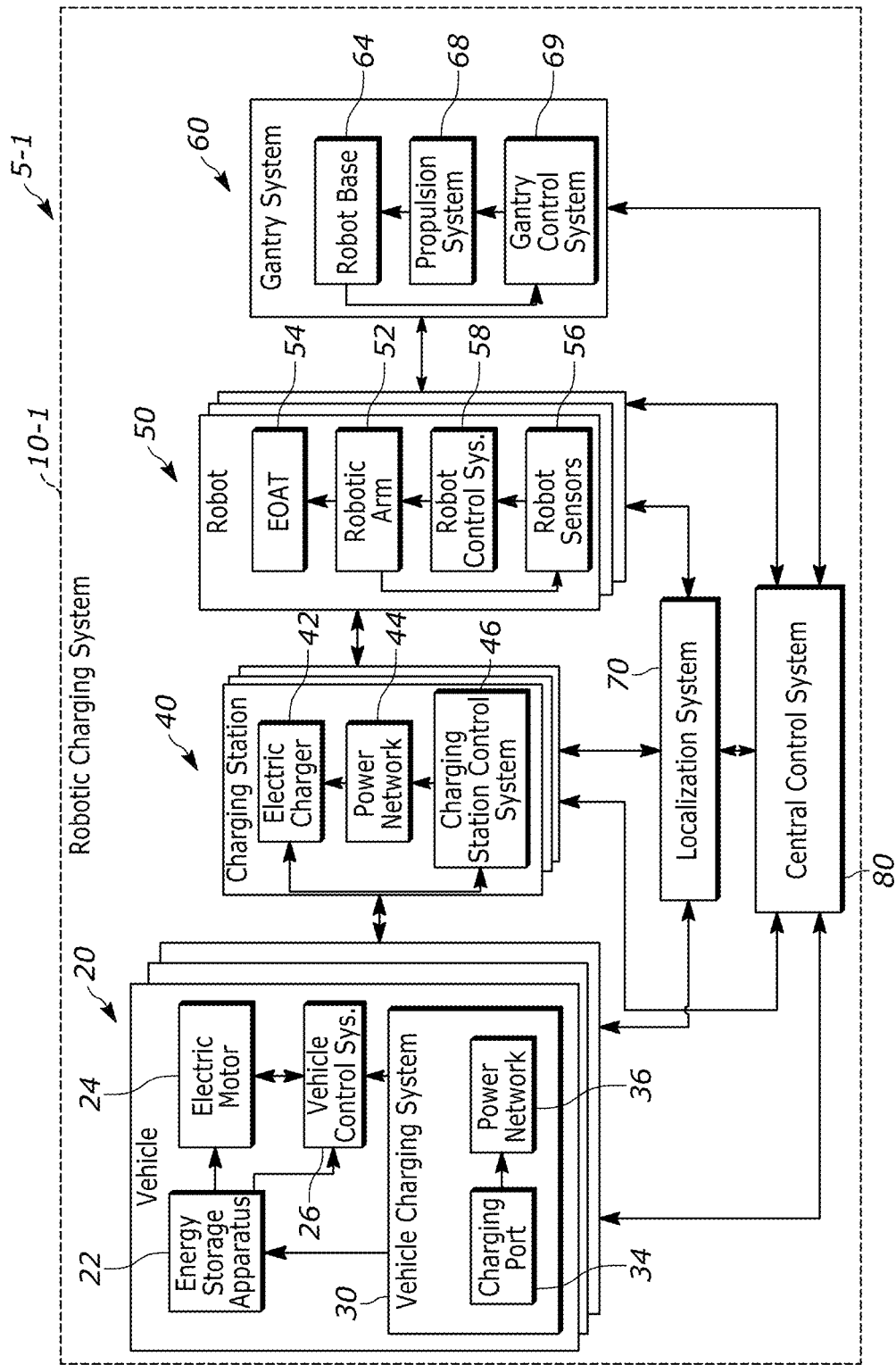
FIG. 1A is a functional block diagram of an example manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for controlling a robotic charging system configured to charge a plurality of vehicles using one or more robots. A central control system obtains vehicle data associated with the plurality of vehicles, charging station data associated with a plurality of charging stations, and robot data associated with one or more robots. The central control system determines, based on the vehicle data, whether a given vehicle from among the plurality of vehicles has a given amount of electrical energy that is less than a threshold amount of electrical energy. In response to determining that the given amount of electrical energy is less than the threshold amount of electrical energy, the central control system selects a given charging station from among the plurality of charging stations based on the charging station data and a given robot from among the one or more robots based on the robot data. Furthermore, in response to determining that the given amount of electrical energy is less than the threshold amount of electrical energy, the central control system instructs the given vehicle and the given robot to navigate to the given charging station and instructs the given robot to initiate a charging routine when the given vehicle and the given robot are proximate to the given charging station. As such, the central control system controls the charging operations of the plurality of vehicles by efficiently managing the assignment and movement of the vehicles and the robots to various charging stations to thereby inhibit the charging time of the vehicles.

Figure 1B:
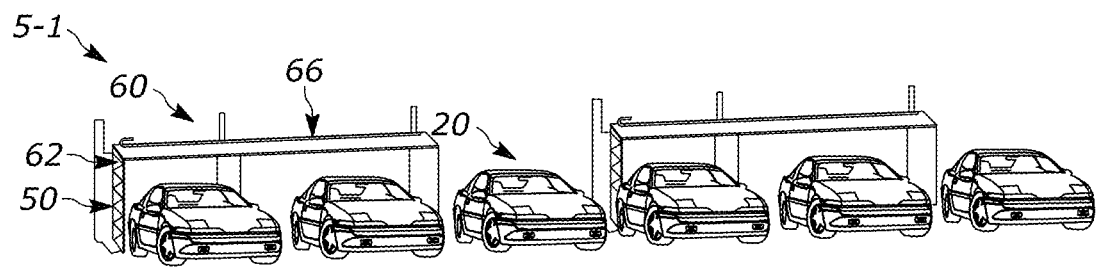
FIG. 1B is a schematic illustration of the example manufacturing environment of FIG. 1A in accordance with the teachings of the present disclosure.

Referring to FIGS. 1A-1B, a manufacturing environment 5-1 is shown and generally includes a robotic charging system 10-1 and a plurality of vehicles 20. In one form, the robotic charging system 10-1 includes a plurality of charging stations 40, one or more robots 50, a gantry system 60, a localization system 70, and a central control system 80. It should be understood that any one of the modules of the vehicles 20, the charging stations 40, the robots 50, the gantry system 60, the localization system 70, and the central control system 80 can be provided at the same location or distributed at different locations (e.g., via one or more edge computing devices) and communicably coupled accordingly. In one form, the vehicles 20, the charging stations 40, the robots 50, the gantry system 60, the localization system 70, and the central control system 80 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the vehicles 20 are provided by electric vehicles. As used herein, "electric vehicle" refers to a vehicle that employs one or more electric motors for propulsion. Example electric vehicles include, but are not limited to, electric-only vehicles (EVs) and hybrid electric vehicles (HEVs). In one form, the vehicles 20 may be provided by autonomous or semi-autonomous vehicles that are configured to perform one or more known autonomous routines within the manufacturing environment 5-1, such as an autonomous navigation routine, a driver assistance routine, an adaptive cruise control routine, an autonomous braking routine, and/or an object detection routine. It should be understood that the vehicles 20 may be provided by other types of vehicles and are not limited to the examples described herein.

In one form, the vehicles 20 may each include an electric motor 24 that employs electrical energy stored in an energy storage apparatus 22, such as one or more vehicle batteries, to perform one or more propulsion-based operations. In one form, the vehicles 20 includes a vehicle control system 26 that is configured to control and/or monitor a particular system or subsystem of the vehicle 20. As an example, the vehicle control system 26 may include a propulsion control module for controlling the operation of the electric motor 24, a powertrain control module for controlling operation of a powertrain system of the vehicle 20, a transmission control module for controlling operation of a transmission system of the vehicle 20, a brake control module for controlling operation of a braking system of the vehicle 20, a body control module for controlling the operation of various electronic accessories in the body of the vehicle 20, a climate control module for controlling operation of a heating and air conditioning system of the vehicle 20, and a suspension control module for controlling operation of a suspension system of the vehicle 20, among other vehicle modules. In one form, the electric motor 24, the energy storage apparatus 22, and the vehicle control system 26 are communicably coupled by a vehicle interface, such as a control system area network (CAN) bus, a local interconnect network (LIN) bus, and/or a clock extension peripheral interface (CXPI) bus.

In one form, the vehicle control system 26 is configured to provide vehicle data associated with the given vehicle 20 to the central control system 80. Additional details regarding the vehicle control system 26 and the vehicle data are provided below with reference to FIGS. 3-5.

Figure 1C:
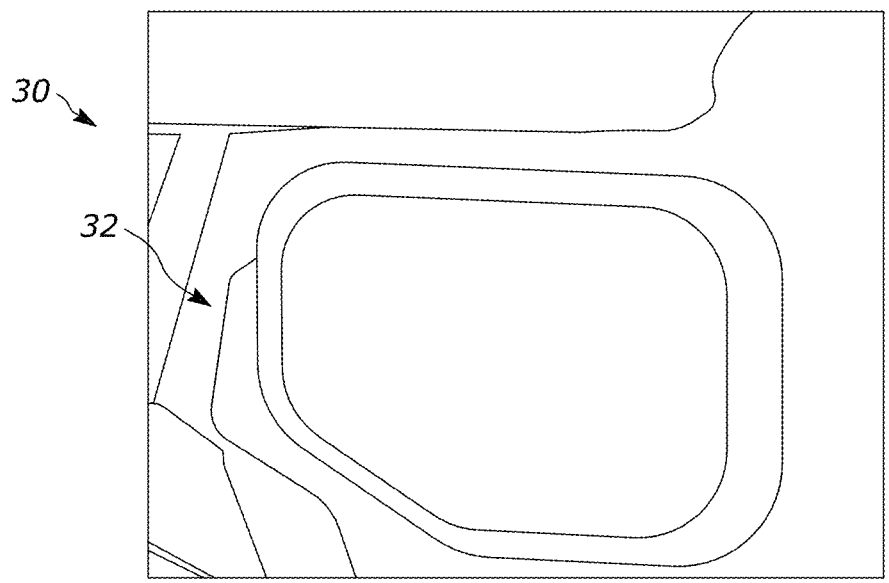
FIG. 1C is a schematic illustration of an example charging port cover in accordance with the teachings of the present disclosure.

In one form and referring to FIGS. 1A-1C, the vehicles 20 may each include a vehicle charging system 30 that is configured to receive electrical energy from the charging stations 40. The vehicle charging system 30 may include a charging port cover 32, a charging port 34, and a power network 36. In one form, the charging port cover 32 is configured to physically isolate the charging port 34 and the power network 36 from an ambient environment of the vehicle 20 and may be provided by, for example, a door or cap.

In one form, the charging port 34 provides an electrical interface for physically and electrically/inductively coupling an electrical charger of the charging station 40 (described below in further detail) to the power network 36. As an example, the charging port 34 is provided by a charging receptacle (e.g., an electrical outlet) that receives one or more conductive components of the electrical charger of the charging station 40. As another example, the charging port 34 is provided by a charging pad (e.g., a wireless power transfer pad comprising one or more inductive coils) that is configured to inductively and physically couple to a charging pad of the electrical charger.

In one form, the power network 36 selectively adjusts one or more characteristics of the electric signal received from the charging stations 40 and provides the adjusted signal to the energy storage apparatus 22. As an example, the power network 36 includes an alternating current-alternating current (AC-AC) converter circuit that is configured to adjust an amplitude and/or frequency component of an AC electric signal, such as a voltage source inverter, a current source inverter, a matrix converter, a cycloconverter, among other AC-AC converter circuits. As another example, the power network 36 includes an AC-direct current (AC-DC) converter circuit that is configured to convert the AC electric signal into a DC electric signal, such as a rectifier circuit and/or other AC-DC converter circuits. As an additional example, the power network 36 includes a DC-AC converter circuit that is configured to convert the DC electric signal into an AC electric signal, such as an inverter circuit and/or other DC-AC converter circuits. As yet another example, the power network 36 includes a DC-DC converter circuit that is configured to adjust an amplitude of the DC electric signal, such as a buck converter circuit, a boost converter circuit, a buck-boost converter circuit, among other DC-DC converter circuits.

In one form, the charging stations 40 are configured to provide electrical energy to the vehicles 20 during a charging routine and include an electric charger 42, a power network 44, and a charging station control system 46. In one form, the electric charger 42 is electrically coupled to a power grid via the power network 44 and may include a conductive cable (e.g., an L4 charger cable) and a charging interface for physically and electrically/inductively coupling to the power network 36 via the charging port 34, such as a plug or a wireless charging pad. In one form, the power network 44 is configured to adjust one or more characteristics of the electrical power output by the grid and provide the adjusted electrical power to the energy storage apparatus 22 via the charging port 34 and the power network 36. As an example, the power network 44 may include similar circuits and converter networks as the power network 36, and as such, the description thereof is omitted for brevity.

In one form, the charging station control system 46 is configured to provide charging station data associated with the given charging station 40 to the central control system 80. Additional details regarding the charging station control system 46 and the charging station data are provided below with reference to FIG. 3.

In one form, the robots 50 include a robotic arm 52, an end of arm tool (EOAT) 54, robot sensors 56, and a robot control system 58 configured to control the robotic arm 52 and the EOAT 54 to perform one or more automated tasks. Example automated tasks include, but are not limited to, retrieving the electric charger 42 from the charging station 40 and moving the electric charger 42 proximate to the vehicle 20 (e.g., the charging port 34), removing the charging port cover 32 to insert the electric charger 42 into the charging port 34, among other automated tasks. Additional details regarding the control of the robotic arm 52 and/or the EOAT 54 are disclosed in U.S. patent application Ser. No. 18/177,954, and titled "ROBOTIC ARM ASSEMBLY FOR ELECTRIC VEHICLE CHARGER," which is commonly owned with the present application and the contents of which are incorporated herein by reference in its entirety.

In one form, the robotic arm 52 is a multi-axis robotic arm having various portions that are rotatable about various axes (e.g., a six-axis robot having five degrees of freedom). In one form, the EOAT 54 includes one or more components for performing the automated tasks described herein, such as an image/vision sensor, a hook, and a gripper. Additional details regarding the one or more components of the EOAT 54 and the arrangement thereof are disclosed in patent application Ser. No. 18/177,954, and titled "ROBOTIC ARM ASSEMBLY FOR ELECTRIC VEHICLE CHARGER," which is commonly owned with the present application and the contents of which are incorporated herein by reference in its entirety.

In one form, the robot sensors 56 generate data corresponding to various characteristics of the robot 50. As an example, the robot sensors 56 may include a power sensor to generate power information (e.g., information regarding amount of current and/or voltage being applied by a power source to the robot 50), a torque sensor configured to generate torque information of various joints of the robot 50, and/or a touch sensor at a handle of the robot 50 configured to detect contact. The robot sensors 56 are configured to provide the corresponding data to the robot control system 58 for controlling the robotic arm 52 and/or EOAT 54.

In one form, the robot control system 58 is configured to provide robot data associated with the robot 50 to the central control system 80. Additional details regarding the robot control system 58 and the robot data are provided below with reference to FIG. 3.

In one form, the gantry system 60 includes a structural base 62, a robot base 64, a plurality of tracks 66, a propulsion system 68, and a gantry control system 69. The structural base 62 is secured to the floor and is configured to physically support the robot base 64 and the plurality of tracks 66, which are generally disposed above the ground. In one variation, the structural base 62 is secured to the ceiling, wall, or other infrastructure element within the manufacturing environment 5-1, and the robot base 64 and the tracks 66 are suspended therefrom such that they are disposed above the ground. In one form, the robot base 64 is secured to the robot 50, disposed within a recess defined by the tracks 66, and moveable along the tracks 66 (e.g., slidably moveable via a plurality of wheels of the robot base 64) such that the robot 50 can initiate the charging routine at any one of the charging stations 40. In one form, the tracks 66 have one-dimensional, two-dimensional, or three-dimensional arrangement to enable the robot base 64 to move along various axes. In one form, the propulsion system 68 includes various known components for moving the robot base 64 and the attached robot 50 along the plurality of tracks 66. As an example, the propulsion system 68 includes drive motors, cable carriers, electrically conductive wires, and other known components that are employed for moving the robot base 64 and the attached robot 50 along the plurality of tracks 66.

In one form, the localization system 70 is configured to localize the robots 50 relative to the vehicles 20 and/or the vehicles 20 relative to the robots 50. That is, the localization system 70 is configured to convert a robot-based position of the robot 50 (i.e., a position of the robot 50 in a robot coordinate system) to a vehicle-based position of the robot 50 (i.e., a position of the robot 50 in a vehicle coordinate system), a vehicle-based position of the vehicle 20 (i.e., a position of the vehicle 20 in a vehicle coordinate system) to a robot-based position of the vehicle 20 (i.e., a position of the vehicle 20 in a robot coordinate system), or a combination thereof. As an example, the localization system 70 may employ known imaging and fiducial marker systems that employ predefined robot/vehicle location coordinates and translation routines for localizing the robots 50 relative to the vehicles 20 and/or the vehicles 20 relative to the robots 50. As another example, the localization system 70 may employ known object detection systems having predefined robot/vehicle location coordinates and translation routines for localizing the robots 50 relative to the vehicles 20 and/or the vehicles 20 relative to the robots 50, such as a guard rail system. Example details regarding guard rail systems that are employed for localizing the robots 50 relative to the vehicles 20 and/or the vehicles 20 relative to the robots 50 are disclosed in U.S. patent application Ser. No. 18/177,964, and titled "SYSTEM AND METHOD FOR CHARGING ELECTRIC VEHICLES," which is commonly owned with the present application and the contents of which are incorporated herein by reference in its entirety.

In one form, the central control system 80 is configured to control the operation of the robotic charging system 10-1. As an example, the central control system 80 obtains robot data associated with the robots 50, vehicle data associated with the vehicles 20, and charging station data associated with the charging stations 40. Furthermore, the central control system 80 determines whether the vehicles 20 have an amount of electrical energy stored in the corresponding energy storage apparatus 22 that is less than a threshold amount, and the central control system 80 instructs a selected robot 50 and the vehicle 20 to navigate to a selected charging station 40 to thereby perform the charging routine. Additional details regarding controlling the operation of the robotic charging system 10-1 are provided below with reference to FIGS. 3-5.

Figure 2A:
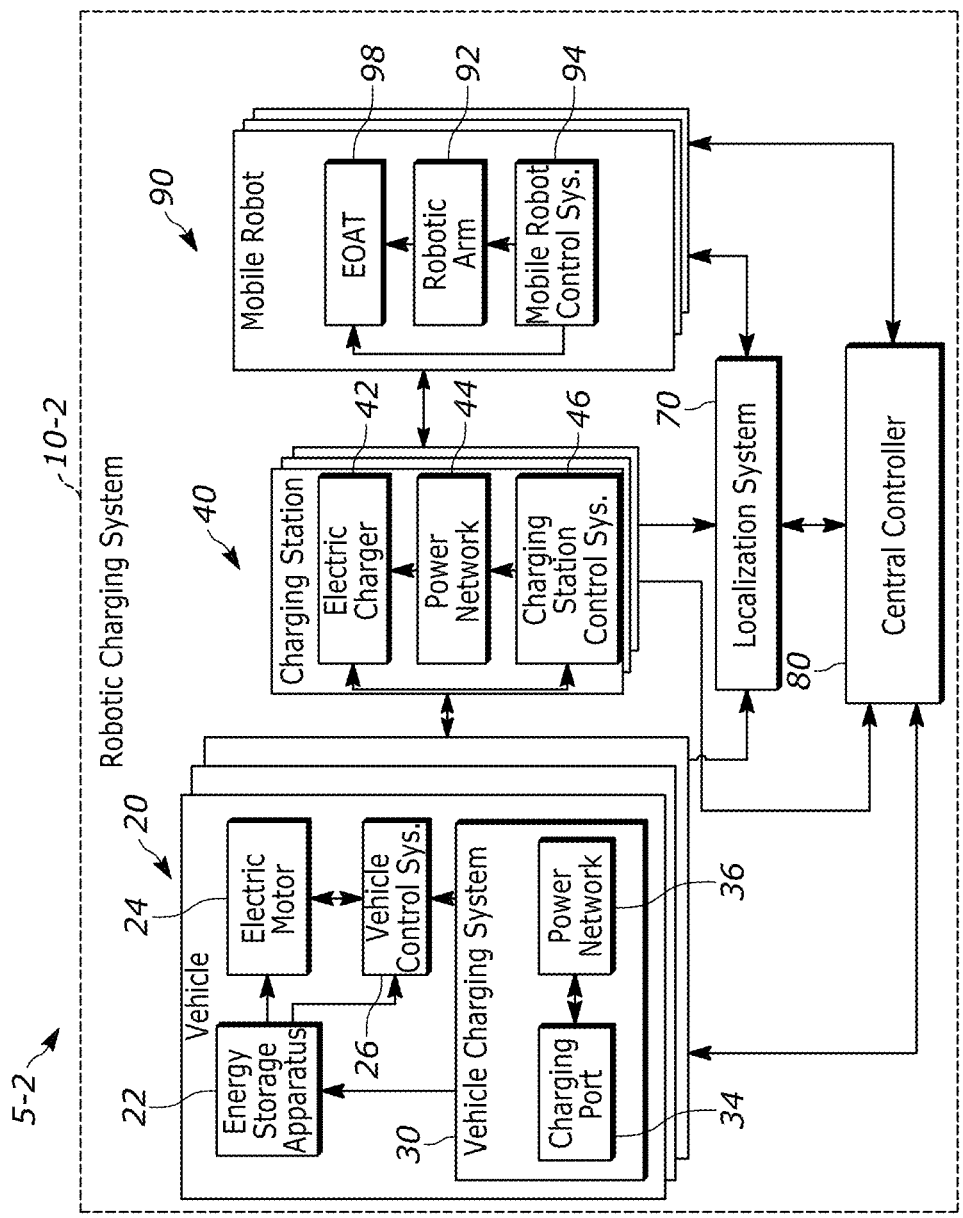
FIG. 2A is a functional block diagram of another example manufacturing environment in accordance with the teachings of the present disclosure.
Figure 2B:
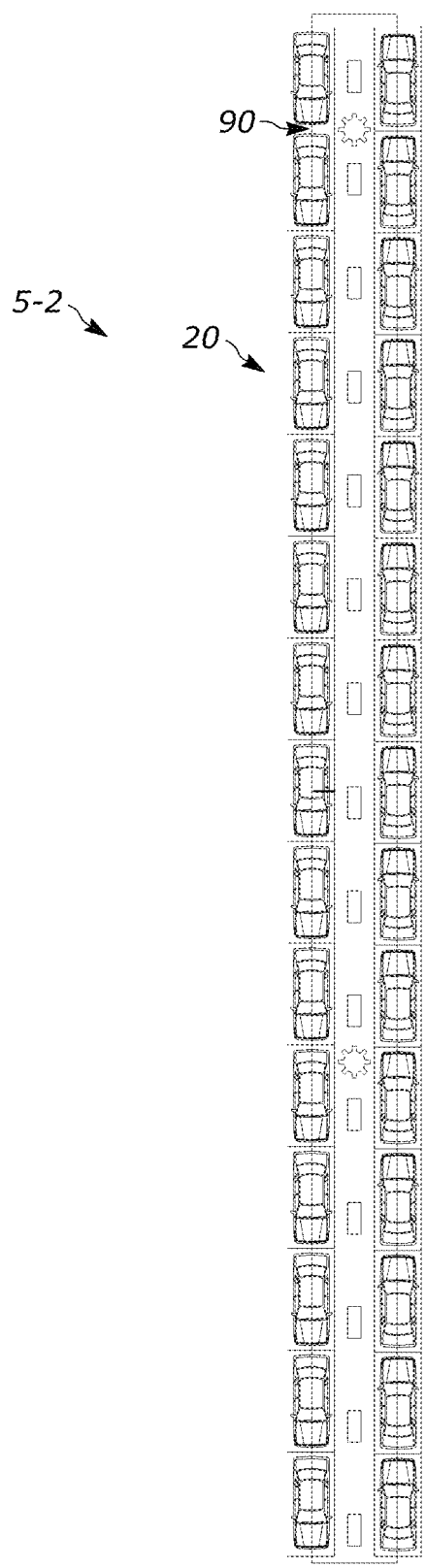
FIG. 2B is a schematic illustration of the example manufacturing environment of FIG. 2A in accordance with the teachings of the present disclosure.

Referring to FIGS. 2A-2B, a manufacturing environment 5-2 is shown and generally includes a robotic charging system 10-2. The robotic charging system 10-2 is similar to the robotic charging system 10-1, except that the robots 50 and the gantry system 60 are replaced with one or more mobile robots 90. In one form, the mobile robots 90 are configured to autonomously move to various locations of the manufacturing environment 5-2, as instructed by the central control system 80. To autonomously move itself, a mobile robot control system 92 is configured to control various movement systems of the mobile robot 90 (e.g., propulsion systems, steering systems, and/or brake systems) via actuators and based on one or more navigation sensors (e.g., a global navigation satellite system (GNSS) sensor, an image sensor, a local position sensor, among others). Furthermore, the mobile robot control system 92 is configured to operate the actuators to control the motion of one or more robotic arms 96 and an EOAT 98 attached thereto and thereby perform one or more automated tasks. Example automated tasks include, but are not limited to, autonomously traveling to a given charging station 40 identified by the central control system 80, retrieving the electric charger 42 from the charging station 40 and moving the electric charger 42 proximate to the vehicle 20 (e.g., the charging port 34), removing the charging port cover 32 to insert the electric charger 42 into the charging port 34, among other automated tasks.

Figure 3:
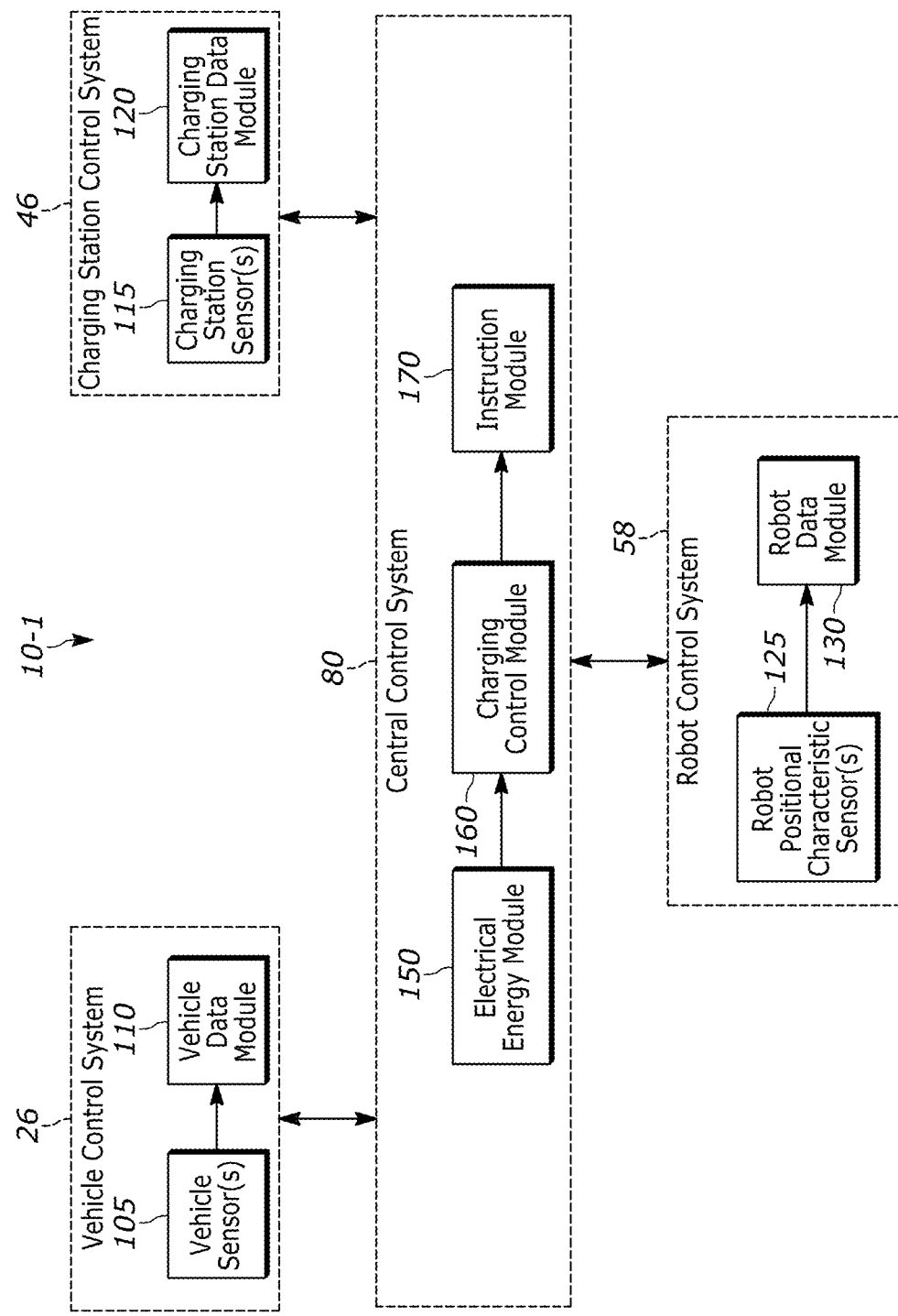
FIG. 3 is a functional block diagram of an example robotic charging system in accordance with the teachings of the present disclosure.

Referring to FIG. 3, a functional block diagram of the vehicle control system 26, the charging station control system 46, the robot control system 58, and the central control system 80 of the robotic charging system 10-1 is shown. In one form, the vehicle control system 26 includes one or more vehicle sensors 105 and a vehicle data module 110, and the charging station control system 46 includes one or more charging station sensors 115 and a charging station data module 120. In one form, the robot control system 58 includes one or more robot positional characteristic sensors 125 and a robot data module 130, and the central control system 80 includes an electrical energy module 150, a charging control module 160, and an instruction module 170.

The one or more vehicle sensors 105 and/or the vehicle data module 110 are configured to generate and broadcast vehicle data associated with the respective vehicle 20 to the central control system 80 via the wireless communication protocol. The vehicle data may indicate one or more electrical charging characteristics of the vehicle 20, one or more positional characteristics of the vehicle 20, and/or one or more physical characteristics of the vehicle 20.

As an example, the one or more vehicle sensors 105 may include known positional characteristic sensors that measure the one or more positional characteristics of the vehicle 20, such as a location of the vehicle 20 (e.g., a vehicle-based location of the vehicle 20), a trajectory of the vehicle 20, and/or an orientation of the vehicle 20. As a more specific example, the positional characteristic sensors may include a location sensor (e.g., a GNSS sensor, an NFC sensor, or UWB sensor) configured to generate information indicative of the location and/or trajectory of the vehicle 20 and/or a gyroscope configured to generate information indicative of the orientation of the vehicle 20.

As another example, the one or more vehicle sensors 105 may include known electrical charge sensors that measure the one or more electrical charging characteristics, such as an amount of electrical energy stored within the energy storage apparatus 22 of the vehicle 20 and/or a charging time of the vehicle 20 (e.g., an amount of time to charge the vehicle 20 to a predetermined energy level of the energy storage apparatus 22).

As an additional example, the vehicle data module 110 stores and broadcasts identifying features of the vehicle 20 (e.g., a vehicle-identification-number and/or other characteristics that uniquely identify the vehicle 20), a corresponding position of the charging port 34 of the vehicle 20 (as the electrical characteristic), and one or more physical characteristics of the vehicle 20. The one or more physical characteristics of the vehicle 20 may include, but are not limited to, a vehicle type of the vehicle 20, a vehicle width of the vehicle 20, and/or a vehicle length of the vehicle 20.

In one form, the one or more charging station sensors 115 and/or the charging station data module 120 are configured to generate and broadcast charging station data associated the respective charging station 40 to the central control system 80 via a wireless communication protocol. The charging station data may indicate an availability of the charging station 40, such as the charging station being in an available state (e.g., one of the vehicles 20 is not provided within the charging station 40 and a charging routine is currently not being performed at the given charging station 40) or an unavailable state (e.g., one of the vehicles 20 is provided within the charging station 40 and/or a charging routine is currently being performed at the given charging station 40). As an example, the one or more charging station sensors 115 include one or more proximity sensors (e.g., a camera, an infrared sensor, a radar scanner, a laser scanner, a light detection and ranging (LIDAR) sensor, an ultrasonic sensor, among other proximity sensors) configured to generate information indicating whether one of the vehicles 20 is within an area defined by the given charging station 40. As another example, the one or more charging stations sensors 115 include one or more known electrical charging state sensors that generate information indicating whether the electric charger 42 is electrically coupled to the vehicle charging system 30. As yet another example, the charging station data module 120 may store a robot-based location of the charging station 40 (i.e., a location of the charging station 40 in the robot coordinate system), which is employed by the localization system 70 for localizing the vehicles 20 relative to the robot 50, as described below in further detail.

In one form, the one or more robot positional characteristic sensors 125 and the robot data module 130 generate and broadcast robot data associated with the respective robot 50 to the central control system 80 via a wireless communication protocol. The robot data may indicate one or more positional characteristics of the respective robot 50, such as a location of the robot 50 (e.g., a robot-based location of the robot 50), a trajectory of the robot 50, and/or an orientation of the robot 50. As an example, the one or more robot positional characteristic sensors 125 may include a location sensor (e.g., an NFC sensor or UWB sensor) configured to generate location information of the robot 50. As another example, the one or more robot positional characteristic sensors 125 may include an accelerometer, a gyroscope, and/or a magnetometer configured to generate orientation information of the robot 50. As yet another example, the one or more robot positional characteristic sensors 125 may include a velocity sensor configured to generate velocity information of the robot 50.

Figure 4:
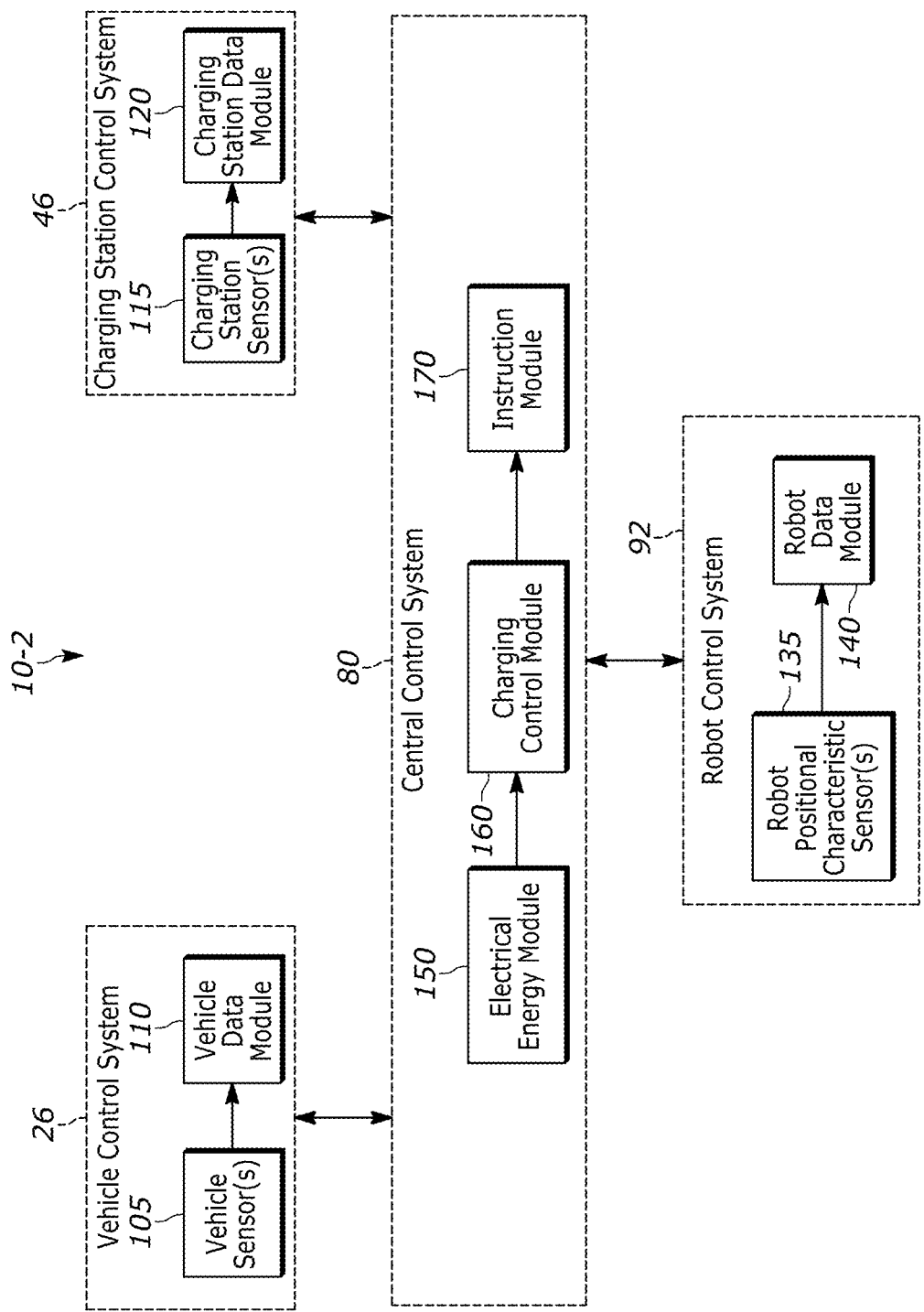
FIG. 4 is a functional block diagram of another example robotic charging system in accordance with the teachings of the present disclosure.

Referring to FIG. 4, a functional block diagram of the vehicle control system 26, the charging station control system 46, the mobile robot control system 92, and the central control system 80 of the robotic charging system 10-2 is shown. As described above, the robotic charging system 10-2 is similar to the robotic charging system 10-1, except that the robot control system 58 is replaced with the mobile robot control system 92. In one form, the mobile robot control system 92 includes one or more robot positional characteristic sensors 135 and a robot data module 140 that generate and broadcast the robot data associated with the mobile robot 90 to the central control system 80 via a wireless communication protocol. In one form, the one or more robot positional characteristic sensors 135 and the robot data module 140 are similar to the one or more robot positional characteristic sensors 125 and the robot data module 130, respectively.

Referring to FIGS. 3-4, the central control system 80 obtains the vehicle data from the vehicle control system 26, the charging station data from the charging station control system 46, and the robot data from the robot control system 58 and/or the mobile robot control system 92. The electrical energy module 150 determines whether one of the vehicles 20 has an amount of electrical energy that is less than a threshold amount of electrical energy based on the vehicle data. As an example, the threshold amount of electrical energy may be associated with an amount of electrical energy indicating that the vehicle 20 needs to be charged.

In one form, the charging control module 160 selects a given charging station from among the plurality of charging stations 40 and a given robot from among the one or more robots 50 and/or the one or more mobile robots 90 for performing a charging routine in response to the electrical energy module 150 determining that a given vehicle has an amount of electrical energy that is less than the threshold amount of electrical energy. The charging control module 160 selects the given charging station 40 for performing the charging routine based on the charging station data and/or the vehicle data, and the charging control module 160 selects the given robot for performing the charging routine based on the robot data.

As an example, the charging control module 160 selects the given charging station 40 as the charging station that is nearest (e.g., distance or time) to the given vehicle 20 (as indicated by the vehicle-based location, trajectory, or orientation of the given vehicle 20) and in the available state (as indicated by the charging station data). Furthermore, the charging control module 160 selects the given robot 50 (or mobile robot 90) that is nearest to the given vehicle 20 (as indicated by the robot-based location, trajectory, or orientation of the given robot). It should be understood that other variations and/or combinations of the vehicle data, charging station data, and the robot data may be employed to select the given robot and the given charging station 40 and are not limited to the examples described herein.

In one form, the instruction module 170 instructs the given vehicle 20 and the given robot to navigate to the given charging station 40. As an example and referring to FIGS. 1A-1B and 3, the instruction module 170 instructs the given robot (e.g., one of the robots 50) to travel along the gantry system 60 to the given charging station 40 and subsequently initiate the charging operation. As another example and referring to FIGS. 1A-1B and 4, the instruction module 170 instructs the given robot (e.g., one of the mobile robots 90) to autonomously travel proximate to the given charging station 40 and subsequently initiate the charging operation.

In one form, the instruction module 170 instructs the given robot to initiate a charging routine when the given vehicle 20 and the given robot are proximate to (i.e., within and/or near) the given charging station 40. As an example, the instruction module 170 obtains the robot-based location of the electric charger 42 (as indicated by the charging station data), the robot-based location of the robot 50 (as indicated by the robot data), and the vehicle-based location of the given vehicle 20 (as indicated by the vehicle data). Furthermore, the instruction module 170 converts the vehicle-based location of the given vehicle 20 to a robot-based location of the vehicle 20 based on the data generated by the localization system 70. Subsequently, the instruction module 170 defines a robotic path between the electric charger 42 and the vehicle 20 based on the robot-based locations of the electric charger 42, the vehicle 20, and the robot 50 by employing known robotic path planning routines. In response to defining the robotic path, the instruction module 170 broadcasts a command to the robot 50 to (i) retrieve the electric charger 42 from the charging station 40, (ii) move the electric charger 42 proximate to the vehicle 20 along the robotic path, (iii) open the charging port cover 32 using the EOAT 54, and (iv) position the electric charger 42 proximate to the charging port 34 based on the robotic path to begin the charging routine.

Figure 5:
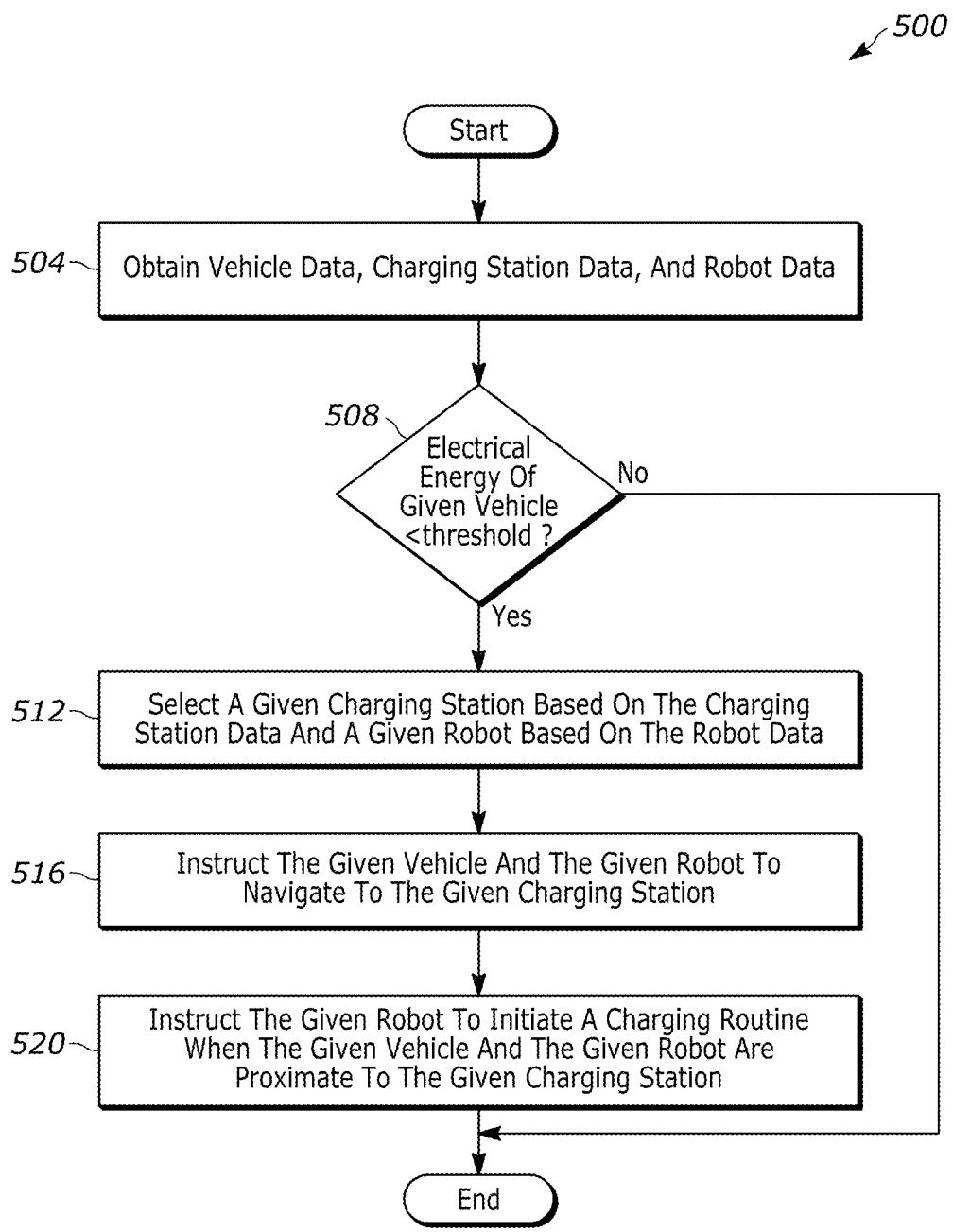
FIG. 5 is a flowchart of an example control routine in accordance with the teachings of the present disclosure.

Referring to FIG. 5, a flowchart illustrating an example routine 500 for controlling the robotic charging system 10-1, 10-2 is shown. At 504, the central control system 80 obtains the vehicle data, the charging station data, and the robot data.

At 508, the central control system 80 determines whether the amount of electrical energy of one of the vehicles is less than the threshold amount of electrical energy. If so, the routine 500 proceeds to 512. Otherwise, the routine 500 ends. At 512, the central control system 80 selects a given charging station based on the charging station data and a given robot based on the robot data. At 516, the central control system 80 instructs the given vehicle and the given robot to navigate to the given charging station. At 520, the central control system 80 instructs the given robot to initiate a charging routine when the given vehicle and the given robot are proximate to the given charging station.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling a robotic charging system configured to charge a plurality of vehicles, the robotic charging system comprising a plurality of charging stations and a plurality of robots, the method comprising:
    obtaining vehicle data associated with the plurality of vehicles, wherein the vehicle data indicates one or more electrical charging characteristics of each of the plurality of vehicles and one or more positional characteristics of each of the plurality of vehicles, and wherein the vehicle data is obtained from one or more vehicle data modules configured to generate and broadcast the vehicle data;
    obtaining charging station data associated with the plurality of charging stations, wherein the charging station data indicates an availability of each of the plurality of charging stations;
    obtaining robot data associated with the plurality of robots, wherein the robot data indicates one or more positional characteristics of each of the plurality of robots and an availability of each of the plurality of robots;
    determining, based on the one or more electrical charging characteristics, whether a given vehicle from among the plurality of vehicles has a given amount of electrical energy that is less than a threshold amount of electrical energy; and
    in response to determining that the given amount of electrical energy is less than the threshold amount of electrical energy:
        selecting a given charging station from among the plurality of charging stations based on the charging station data and the one or more positional characteristics of each of the plurality of vehicles, wherein the given charging station is nearest to the given vehicle relative to a second set of vehicles among the plurality of vehicles;
        selecting a given robot from among the plurality of robots based on the one or more positional characteristics of each of the plurality of robots and the one or more positional characteristics of the given vehicle, wherein the given robot is nearest to the given vehicle relative to a second set of robots among the plurality of robots;
        instructing the given vehicle and the given robot to navigate to the given charging station; and
        instructing the given robot to initiate a charging routine when the given vehicle and the given robot are proximate to the given charging station.

2. The method of claim 1, wherein the one or more electrical charging characteristics of each of the plurality of vehicles indicates an amount of electrical energy of each of the plurality of vehicles, a charging time of each of the plurality of vehicles, a position of a charging port of each of the plurality of vehicles, or a combination thereof, wherein one or more vehicles of the plurality of vehicles are autonomous vehicles, and wherein instructing the given vehicle and the given robot to navigate to the given charging station comprises instructing the given vehicle to autonomously navigate to the given charging station.

3. The method of claim 1, wherein the vehicle data further indicates one or more physical characteristics of each of the plurality of vehicles, and wherein the one or more vehicle data modules are configured to receive the one or more positional characteristics from one or more vehicle sensors located within one or more vehicles of the plurality of vehicles.

4. The method of claim 3, wherein the one or more positional characteristics of each of the plurality of vehicles indicates a location of each of the plurality of vehicles, a trajectory of each of the plurality of vehicles, an orientation of each of the plurality of vehicles, or a combination thereof.

5. The method of claim 3, wherein the one or more physical characteristics of each of the plurality of vehicles indicates a vehicle type of each of the plurality of vehicles, a vehicle width of each of the plurality of vehicles, a vehicle length of each of the plurality of vehicles, or a combination thereof.

6. The method of claim 1, wherein the one or more positional characteristics of each of the plurality of robots indicates a location of each of the plurality of robots, a trajectory of each of the plurality of robots, an orientation of each of the plurality of robots, or a combination thereof.

7. The method of claim 1, wherein instructing the given robot to navigate to the given charging station further comprises broadcasting a command to the given robot to travel along a gantry proximate to the given charging station.

8. The method of claim 1, wherein the given robot is a mobile robot, and wherein instructing the given robot to navigate to the given charging station further comprises broadcasting a command to the mobile robot to autonomously travel proximate to the given charging station.

9. The method of claim 1, wherein:
the vehicle data further indicates a vehicle-based location of the given vehicle;
the robot data indicates a robot-based location of the given robot; and
instructing the given robot to initiate the charging routine when the given vehicle and the given robot are proximate to the given charging station further comprises:
obtaining a robot-based location of an electric charger of the given charging station;
converting the vehicle-based location of the given vehicle to a robot-based location of the given vehicle; and
defining a robotic path based on the robot-based location of the electric charger, the robot-based location of the given robot, and a robot-based location of the given vehicle.

10. The method of claim 9, wherein instructing the robot to initiate the charging routine when the given vehicle and the given robot are proximate to the given charging station further comprises:
opening, by an end of arm tool of the given robot, a charging port cover of the given vehicle; and
positioning, by the end of arm tool, the electric charger proximate to a charging port of the given vehicle based on the robotic path.

11. A system for controlling a robotic charging system configured to charge a plurality of vehicles, the robotic charging system comprising a plurality of charging stations and a plurality of robots, the system comprising:
one or more processors; and
one or more nontransitory computer-readable mediums comprising instructions that are executable by the one or more processors, wherein the instructions comprise:
obtaining vehicle data associated with the plurality of vehicles, wherein the vehicle data indicates one or more electrical charging characteristics of each of the plurality of vehicles and one or more positional characteristics of each of the plurality of vehicles, and wherein the one or more electrical charging characteristics of each of the plurality of vehicles indicates an amount of electrical energy of each of the plurality of vehicles, a charging time of each of the plurality of vehicles, a position of a charging port of each of the plurality of vehicles, or a combination thereof, and wherein the vehicle data is obtained from one or more vehicle data modules configured to generate and broadcast the vehicle data;
obtaining charging station data associated with the plurality of charging stations, wherein the charging station data indicates an availability of each of the plurality of charging stations;
obtaining robot data associated with the plurality of robots, wherein the robot data indicates one or more positional characteristics of each of the plurality of robots and an availability of each of the plurality of robots;
determining, based on the one or more electrical charging characteristics, whether a given vehicle from among the plurality of vehicles has a given amount of electrical energy that is less than a threshold amount of electrical energy; and
in response to determining that the given amount of electrical energy is less than the threshold amount of electrical energy:
selecting a given charging station from among the plurality of charging stations based on the charging station data and the one or more positional characteristics of each of the plurality of vehicles, wherein the given charging station is nearest to the given vehicle relative to a second set of vehicles among the plurality of vehicles;
selecting a given robot from among the plurality of robots based on the one or more positional characteristics of each of the plurality of robots and the one or more positional characteristics of the given vehicle, wherein the given robot is nearest to the given vehicle relative to a second set of robots among the plurality of robots;
instructing the given vehicle and the given robot to navigate to the given charging station; and
instructing the given robot to initiate a charging routine when the given vehicle and the given robot are proximate to the given charging station.

12. The system of claim 11, wherein the vehicle data further indicates one or more physical characteristics of each of the plurality of vehicles, and wherein the one or more vehicle data modules are configured to receive the one or more positional characteristics from one or more vehicle sensors located within one or more vehicles of the plurality of vehicles.

13. The system of claim 12, wherein the one or more positional characteristics of each of the plurality of vehicles indicates a location of each of the plurality of vehicles, a trajectory of each of the plurality of vehicles, an orientation of each of the plurality of vehicles, or a combination thereof.

14. The system of claim 12, wherein the one or more physical characteristics of each of the plurality of vehicles comprises a vehicle type of each of the plurality of vehicles, a vehicle width of each of the plurality of vehicles, a vehicle length of each of the plurality of vehicles, or a combination thereof.

15. The system of claim 11, wherein the one or more positional characteristics of each of the plurality of robots indicates a location of each of the plurality of robots, a trajectory of each of the plurality of robots, an orientation of each of the plurality of robots, or a combination thereof.

16. The system of claim 11, wherein:
the vehicle data further indicates a vehicle-based location of the given vehicle;
the robot data indicates a robot-based location of the given robot; and
the instructions for instructing the given robot to initiate the charging routine when the given vehicle and the given robot are proximate to the given charging station further comprise:
  obtaining a robot-based location of an electric charger of the given charging station;
  converting the vehicle-based location of the given vehicle to a robot-based location of the given vehicle; and
  defining a robotic path based on the robot-based location of the electric charger, the robot-based location of the given robot, and a robot-based location of the given vehicle.

17. The system of claim 16, wherein the instructions for instructing the robot to initiate the charging routine when the given vehicle and the given robot are proximate to the given charging station further comprise:
  opening, by an end of arm tool of the given robot, a charging port cover of the given vehicle; and
  positioning, by the end of arm tool, the electric charger proximate to a charging port of the given vehicle based on the robotic path.

18. A method for controlling a robotic charging system configured to charge a plurality of vehicles, the robotic charging system comprising a plurality of charging stations and plurality of robots, the method comprising:
  obtaining vehicle data associated with the plurality of vehicles, wherein the vehicle data indicates one or more electrical charging characteristics of each of the plurality of vehicles and one or more positional characteristics of each of the plurality of vehicles, and wherein the one or more electrical charging characteristics of each of the plurality of vehicles indicates an amount of electrical energy of each of the plurality of vehicles, a charging time of each of the plurality of vehicles, a position of a charging port of each of the plurality of vehicles, or a combination thereof, and wherein the vehicle data is obtained from one or more vehicle data modules configured to generate and broadcast the vehicle data;
  obtaining charging station data associated with the plurality of charging stations, wherein the charging station data indicates an availability of each of the plurality of charging stations;
  obtaining robot data associated with the plurality of robots, wherein the robot data indicates one or more positional characteristics of each of the plurality of robots and an availability of each of the plurality of robots;
  determining, based on the one or more electrical charging characteristics, whether a given vehicle from among the plurality of vehicles has a given amount of electrical energy that is less than a threshold amount of electrical energy; and
  in response to determining that the given amount of electrical energy is less than the threshold amount of electrical energy:
    selecting a given charging station from among the plurality of charging stations based on the charging station data and the one or more positional characteristics of each of the plurality of vehicles, wherein the given charging station is nearest to the given vehicle relative to a second set of vehicles among the plurality of vehicles;
    selecting a given robot from among the plurality of robots based on the one or more positional characteristics of each of the plurality of robots and the one or more positional characteristics of the given vehicle, wherein the given robot is nearest to the given vehicle relative to a second set of robots among the plurality of robots;
    instructing the given vehicle and the given robot to navigate to the given charging station; and
    instructing the given robot to initiate a charging routine when the given vehicle and the given robot are proximate to the given charging station.

19. The method of claim 18, wherein:
the vehicle data further indicates a vehicle-based location of the given vehicle;
the robot data indicates a robot-based location of the given robot; and
instructing the given robot to initiate the charging routine when the given vehicle and the given robot are proximate to the given charging station further comprises:
  obtaining a robot-based location of an electric charger of the given charging station;
  converting the vehicle-based location of the given vehicle to a robot-based location of the given vehicle; and
  defining a robotic path based on the robot-based location of the electric charger, the robot-based location of the given robot, and a robot-based location of the given vehicle.

20. The method of claim 19, wherein instructing the robot to initiate the charging routine when the given vehicle and the given robot are proximate to the given charging station further comprises:
  opening, by an end of arm tool of the given robot, a charging port cover of the given vehicle; and
  positioning, by the end of arm tool, the electric charger proximate to a charging port of the given vehicle based on the robotic path.

* * * * *